(12) United States Patent
Seshia et al.

(10) Patent No.: US 11,604,207 B2
(45) Date of Patent: Mar. 14, 2023

(54) HIGH PERFORMANCE MICRO-ELECTRO-MECHANICAL SYSTEMS ACCELEROMETER WITH SUSPENDED SENSOR ARRANGEMENT

(71) Applicant: Cambridge Enterprise Limited, Cambridgeshire (GB)

(72) Inventors: Ashwin Arunkumar Seshia, Cambridgeshire (GB); Xudong Zou, Beijing (CN)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 360 days.

(21) Appl. No.: 16/608,282

(22) PCT Filed: Apr. 24, 2018

(86) PCT No.: PCT/GB2018/051072
§ 371 (c)(1),
(2) Date: Oct. 25, 2019

(87) PCT Pub. No.: WO2018/197861
PCT Pub. Date: Nov. 1, 2018

(65) Prior Publication Data
US 2020/0124634 A1    Apr. 23, 2020

(30) Foreign Application Priority Data

Apr. 27, 2017   (GB) ...................................... 1706733

(51) Int. Cl.
*G01P 15/097*   (2006.01)
*G01P 15/08*    (2006.01)
*G01P 21/00*    (2006.01)

(52) U.S. Cl.
CPC ............ *G01P 15/097* (2013.01); *G01P 15/08* (2013.01); *G01P 15/0802* (2013.01); *G01P 21/00* (2013.01)

(58) Field of Classification Search
CPC ........ G01P 15/097; G01P 15/08; G01P 15/18; G01P 15/0802; G01P 15/10; G01P 15/13; G01P 15/131; G01P 15/133
See application file for complete search history.

(56) References Cited

U.S. PATENT DOCUMENTS 3,238,789 A * 3/1966 Erdley ..................... H03B 5/30
                                                            73/514.29
5,005,413 A    4/1991 Novack et al.
(Continued)

FOREIGN PATENT DOCUMENTS

JP    2008-209388 A    9/2008
JP    2008209388 A     9/2008
(Continued)

OTHER PUBLICATIONS

Etienne, Athina Nickitas; PCT/GB2018/051071; International Preliminary Report on Patentability; 12 pages; dated Nov. 7, 2019. Nov. 7, 2019.
(Continued)

*Primary Examiner* — Helen C Kwok
(74) *Attorney, Agent, or Firm* — Nexsen Pruet, LLC; Todd A. Serbin

(57) ABSTRACT

The invention provides a resonant sensor comprising: a substrate; one or more proof masses suspended from the substrate to allow for movement of the one or more proof masses along a sensitive axis; a first resonant element having a first end and a second end, the first resonant element extending between the first end and the second end along the sensitive axis, wherein the first end is connected to the one or more proof masses through a non-inverting lever and the (Continued)

second end is connected to the one or more proof masses through an inverting lever; and an electrode assembly positioned adjacent to the first resonant element. A resonant sensor in accordance the invention comprises a resonant element that is suspended between two proof masses or between two portions of a single proof mass, and so is not connected directly to the substrate. This isolates the resonant element from thermal stress that might otherwise be transferred from the substrate.

20 Claims, 9 Drawing Sheets

(56) References Cited

U.S. PATENT DOCUMENTS

| | | | |
|---|---|---|---|
| 5,969,249 A * | 10/1999 | Roessig | G01P 15/0802 73/514.15 |
| 7,802,475 B2 | 9/2010 | Nishizawa et al. | |
| 9,310,391 B2 | 4/2016 | Seshia et al. | |
| 9,551,576 B2 | 1/2017 | Thiruvenkatanathan et al. | |
| 2009/0194830 A1 | 8/2009 | Ransley et al. | |
| 2010/0089157 A1* | 4/2010 | Quer | G01P 15/097 73/504.12 |
| 2012/0067124 A1* | 3/2012 | Zolfagharkhani | G01C 19/5733 73/579 |
| 2013/0298675 A1* | 11/2013 | Thiruvenkatanathan | G01C 19/5755 73/504.16 |
| 2014/0305208 A1* | 10/2014 | Thiruvenkatanathan | G01P 15/097 73/504.12 |
| 2015/0226762 A1* | 8/2015 | Seshia | G01P 15/097 73/495 |
| 2016/0139171 A1* | 5/2016 | Becka | G01P 15/032 73/514.29 |
| 2018/0209791 A1* | 7/2018 | Chang | G01C 19/5747 |
| 2019/0301870 A1 | 10/2019 | Seshia et al. | |
| 2020/0096536 A1* | 3/2020 | Zou | G01P 15/0802 |
| 2020/0166537 A1* | 5/2020 | Zou | G01P 15/0802 |

FOREIGN PATENT DOCUMENTS

| | | |
|---|---|---|
| WO | 2011/148137 A1 | 12/2011 |
| WO | 2013/076490 A1 | 5/2013 |
| WO | 2014/037695 A2 | 3/2014 |
| WO | 2017/007428 A1 | 1/2017 |
| WO | 2017/212272 A1 | 12/2017 |

OTHER PUBLICATIONS

Xudong, Zou, "High Resolution Resonant Accelerometer Based on MEMS Technology," University of Cambridge; Department of Engineering; Dissertation; Nov. 2013; 279 pages.

Zou et al., "A High Resolution Resonant MEMS Accelerometer," Nanoscience Centre, Department of Engineering, University of Cambridge, U.K.; Jun. 21-25, 2015; 4 pages. Jun. 21, 2015.

Zou et al., "A high-resolution micro-electro-mechanical resonant tilt sensor," Sensors and Actuators A: 220 (2014) 168-177; www.elsevier.com/locate/sna; 2014; 10 pages.

Zou et al., "A Seismic-Grade Resonant MEMS Accelerometer," Journal of Microelectromechanical Systems, vol. 23, No. 4, Aug. 2014; 3 pages.

International Search Report dated Jul. 10, 2018 in PCT/GB2018/051072 (5 pages).

Seshia et al., U.S. Appl. No. 16/481,660, filed Jul. 29, 2019.

UK Intellectual Property Office Search Report dated Nov. 2, 2017 in GB 1706733.1 (3 pages).

Written Opinion dated Jul. 10, 2018 in PCT/GB2018/051072 (8 pages).

* cited by examiner

HIGH PERFORMANCE MICRO-ELECTRO-MECHANICAL SYSTEMS ACCELEROMETER WITH SUSPENDED SENSOR ARRANGEMENT

CROSS REFERENCE TO RELATED APPLICATIONS

This application is a 35 U.S.C. § 371 U.S. national phase entry of International Application No. PCT/GB2018/051072 having an international filing date of Apr. 24, 2018, which claims the benefit of GB Application No. 1706733.1 filed Apr. 27, 2017, each of which is incorporated herein by reference in its entirety.

BACKGROUND

The present invention relates to micro-electro-mechanical systems (MEMS) accelerometers, and in particular to high performance accelerometers capable of providing a high resolution measurement of acceleration suitable for low-frequency or quasi static accelerations.

Oscillators based on lightly damped microscopic mechanical resonators are well known for their ability to produce stable, low-noise frequency outputs. While these characteristics make them valuable in communication systems as stable timing/frequency references, they also make them attractive for use as sensors. A resonant sensor, by definition, is an oscillator whose output frequency is a function of an input measurand. In other words, the output of a resonant sensor corresponds to the shift in resonant frequency of a mechanical microstructure that gets tuned in accordance to a change in a physical/chemical quantity to be measured. The quasi-digital nature of the output signal in such sensors, along with the sensitivity and stability of the frequency shifted output signals, have resulted in wide spread use of such micromachined resonant sensors for numerous applications ranging from bio-molecular and chemical diagnostics, to high-precision force, mass, strain and even charge sensing.

However, for some applications it would be desirable to provide a resonant sensor design with even greater sensitivity and stability of acceleration measurements.

SUMMARY

In a first aspect of the invention, there is provided a resonant sensor comprising:
a substrate;
one or more proof masses suspended from the substrate to allow for movement of the one or more proof masses along a sensitive axis;
a first resonant element having a first end and a second end, the first resonant element extending between the first end and the second end along the sensitive axis, wherein the first end is connected to the one or more proof masses through a non-inverting lever and the second end is connected to the one or more proof masses through an inverting lever; and an electrode assembly positioned adjacent to the first resonant element.

An inverting lever is a lever that provides an output force or displacement in an opposite direction to an input force or displacement. A non-inverting lever is a lever that provides an output force or displacement in the same direction to an input force or displacement A resonant sensor in accordance the invention comprises a resonant element that is suspended between two proof masses or between two portions of a single proof mass, and so is not connected directly to the substrate. This isolates the resonant element from thermal stress that might otherwise be transferred from the substrate.

Advantageously, the inertial force loaded on the first end of the resonant element is equal to the inertial force loaded on the second end of the resonant element. The inverting lever may have a mechanical advantage of the same magnitude as the non-inverting lever.

The inverting and non-inverting levers may be microlevers. Each of the levers may comprise a main beam extending orthogonal to the sensitive axis. The resonant sensor may further comprise a stiffening beam extending between the main beam of each lever and the one or more proof masses to which it is connected, the stiffening beam extending along the sensitive axis.

The resonant sensor may comprise a first proof mass and a second proof mass, a first end of the first resonant element connected to the first proof mass though the non-inverting lever and the second end of the first resonant element connected to the second proof mass through the inverting lever. The first proof mass may have the same mass as the second proof mass. The first proof mass may be substantially identical to the second proof mass.

The electrode assembly may comprise a pair of plate electrodes positioned on opposite sides of the first resonant element. The electrode assembly may be used both to drive the resonant element at a resonant frequency using a drive signal and to sense the response of the resonant element to the drive signal.

The first resonant element may be of any suitable form, for example a single rectangular beam or a double ended tuning fork (DETF) resonator.

The resonant sensor may further comprise drive and sense circuitry connected to the electrode assembly, the drive and sense circuitry configured to provide a drive signal to drive the first resonant element in a first resonant mode and to sense the response of the resonant element. Advantageously, the sense circuitry is configured to provide an output based on a resonant frequency shift of the first resonant element.

The resonant sensor may further comprise a second resonant element coupled to the first resonant element but not coupled to the one or more proof masses. The second resonant element may be coupled (preferably weakly coupled) to the first resonant element mechanically or electrostatically. A second electrode assembly may be provided adjacent the second resonant element and may be connected to the drive and sense circuitry. The sense circuitry may then be configured to provide an output based on a change in relative amplitude of vibration between the first resonant element and the second resonant element. Advantageously, the second resonant element is connected to the substrate through a pair levers substantially identical to the levers connected to the first resonant element. This provides mechanical symmetry, which may improve the sensitivity of the output of the resonant sensor.

The resonant sensor may further comprise a second resonant element having a first end and a second end, the second resonant element extending between the first end and the second end along the sensitive axis, wherein the first end of the second resonant element is connected to the one or more proof masses through a non-inverting lever and the second end of the second resonant element is connected to the one or more proof masses through an inverting lever, and wherein the drive and sense circuitry is configured to drive the second resonant element in a different resonant mode to the first resonant mode and to sense the response of the second resonant element, and wherein the sense circuitry is configured to provide an output based on a resonant frequency shift of the first resonant element and a resonant frequency shift of the second resonant element.

The one or more proof masses may be suspended from the substrate by a plurality of flexures. One or more of the flexures may advantageously have a serpentine shape. The one or more serpentine flexures may have a variable in-plane width, such that the width of the serpentine flexure is smaller in a mid-section between the substrate and the proof mass than at end-sections that are respectively connected to the substrate and the proof mass. The serpentine flexure may be formed from beam segments. The length of the beam segments may be variable such that the beam segments are longer in a mid-section between the substrate and the proof mass than at end-sections that are respectively connected to the substrate and the proof mass. This structure of flexure provides an even distribution of stress along the flexure during displacement of the proof mass and so reduces the spring hardening effect and improves the sensitivity of the sensor.

The resonant sensor may be microelectromechanical systems (MEMS) sensor. The substrate, proof mass, flexures and first and second resonant elements are formed from silicon.

The resonant sensor may be configured as a gravity sensor.

The resonant sensor may further comprise a substrate electrode on the substrate, adjacent to the at least one proof mass; and electric circuitry connected to the substrate electrode configured to apply a voltage to the substrate electrode providing an electrostatic force on the proof mass. The application of an electrostatic force on the proof mass can be used to provide a number of benefits.

The electric circuitry may be configured to apply an alternating calibration signal to the substrate electrode to drive the proof mass at a calibration frequency. The resonant sensor may be configured to use the response of the resonant element or resonant elements at the calibration frequency to calibrate the resonant sensor. The calibration signal is used to apply a known inertial force on the resonant element or resonant elements so that the response, and in particular the scale factor, can be calibrated for different modes of vibration. This can be done periodically and automatically even after the sensor has been deployed in an inaccessible location.

The electric circuitry may also or alternatively be configured to apply a DC biasing voltage to the substrate electrode. A DC biasing voltage may pre-stress the resonant element or resonant elements. This can be done to improve the acceleration sensitivity of the sensor and reduce temperature sensitivity, at the cost of reduced dynamic range.

The resonant sensor may further comprise at least one additional electrode on the substrate, adjacent to the proof mass, and the electric circuitry may be configured to apply a damping signal to the substrate electrode or the at least one additional electrode. The damping signal may be calculated based on a sensed motion of the proof mass, using signals from the substrate electrode or the at least one additional electrode. This allows the proof mass to be quickly brought back to rest following a shock, so that further measurements can be made.

DRAWINGS

Embodiments of the invention will now be described in detail, by way of example only, with reference to the accompanying drawings, in which.

DESCRIPTION

Figure 1:
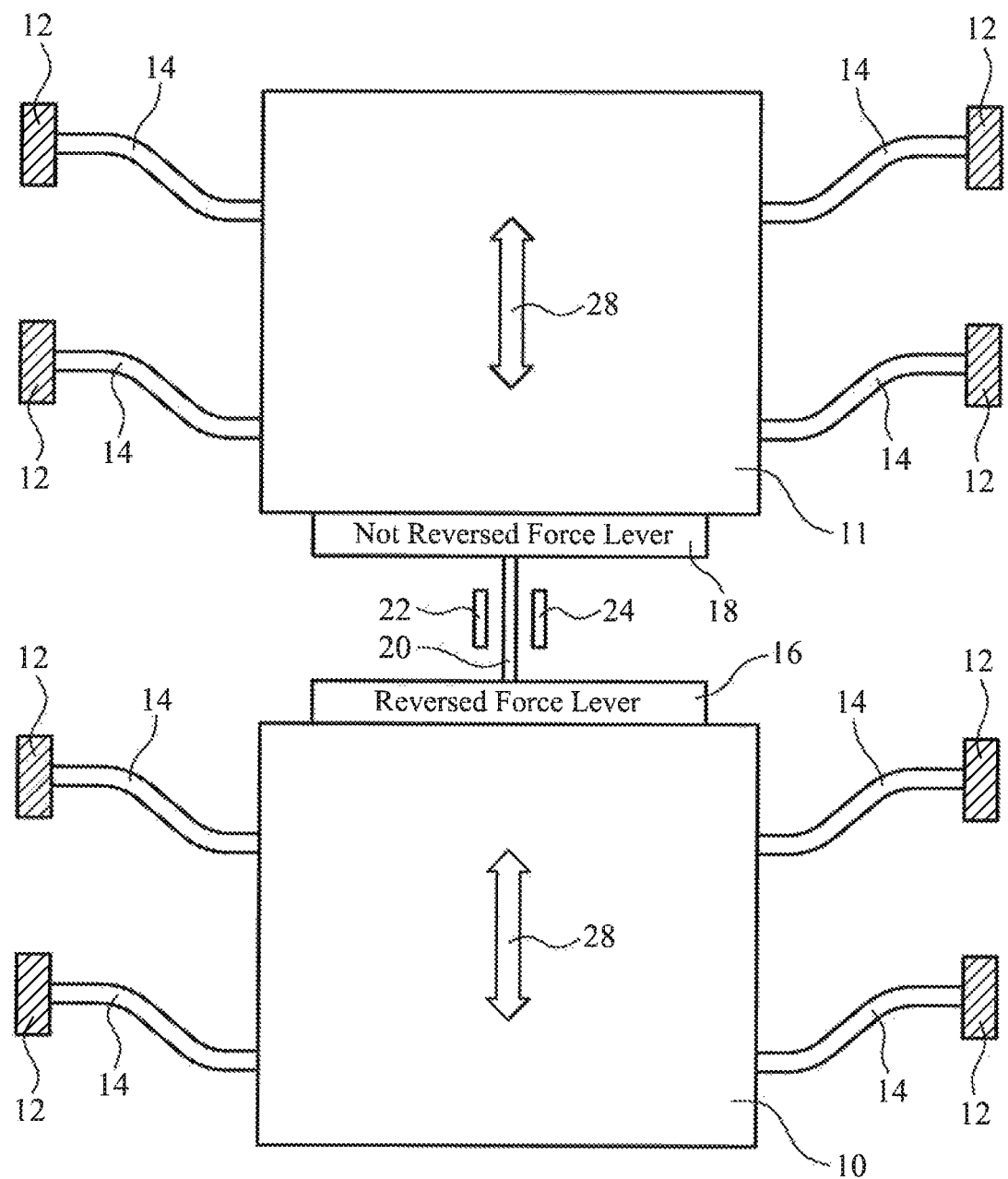
FIG. 1 is a schematic illustration of an accelerometer in accordance with a first embodiment of the invention.

FIG. 1 is a schematic illustration of an accelerometer in accordance with a first embodiment of the invention. The accelerometer is a MEMS device formed from a single crystal of silicon. The accelerometer comprises a first proof mass 10 and a second proof mass 11, suspended from a surrounding frame or substrate 12 by a plurality of flexures 14. The first proof mass is substantially identical to the second proof mass. A first resonant element 20 is connected at one end to the first proof mass 10 through a first amplifying microlever 16. The first resonant element 20 is connected at an opposite end to the second proof mass 11 through a second amplifying microlever 18. The amplifying microlevers 16, 18 are of opposite type to one another. In this example, the first amplifying microlever 16 is a non-inverting microlever and the second amplifying microlever 18 is an inverting microlever. In operation, the resonant element 20 is driven to resonance by the application of an alternating current to electrode 24 adjacent to the resonant element.

The accelerometer is sensitive to acceleration along a sensitive axis, illustrated by arrow 28. The resonant element is connected at opposite ends in the direction of the sensitive axis to the proof masses 10, 11, and the microlevers 16,18 are of the opposite type so that each end of resonant element experiences an opposite force along the sensitive axis as a result of acceleration of the proof masses along the sensitive axis. Amplifying microlevers 16 and 18 amplify the inertial force applied to the resonant element as a result of displacement of the proof masses along the sensitive axis. Any acceleration of the proof masses along the sensitive axis consequently gets translated into an equal magnitude of strain on each of the opposite ends of the resonant element. In other words, both ends of the resonant element undergo an axial tensile stress or an axial compressive stress depending on the direction of acceleration. The induced strain on the resonant element results in a shift of its resonant frequency.

The fact that the resonant element is suspended between two proof masses, or between two portions of a proof mass, means that it is relatively isolated from thermal stresses in the surrounding substrate. This reduces thermal drift and improves the accuracy of the sensor.

Figure 2:
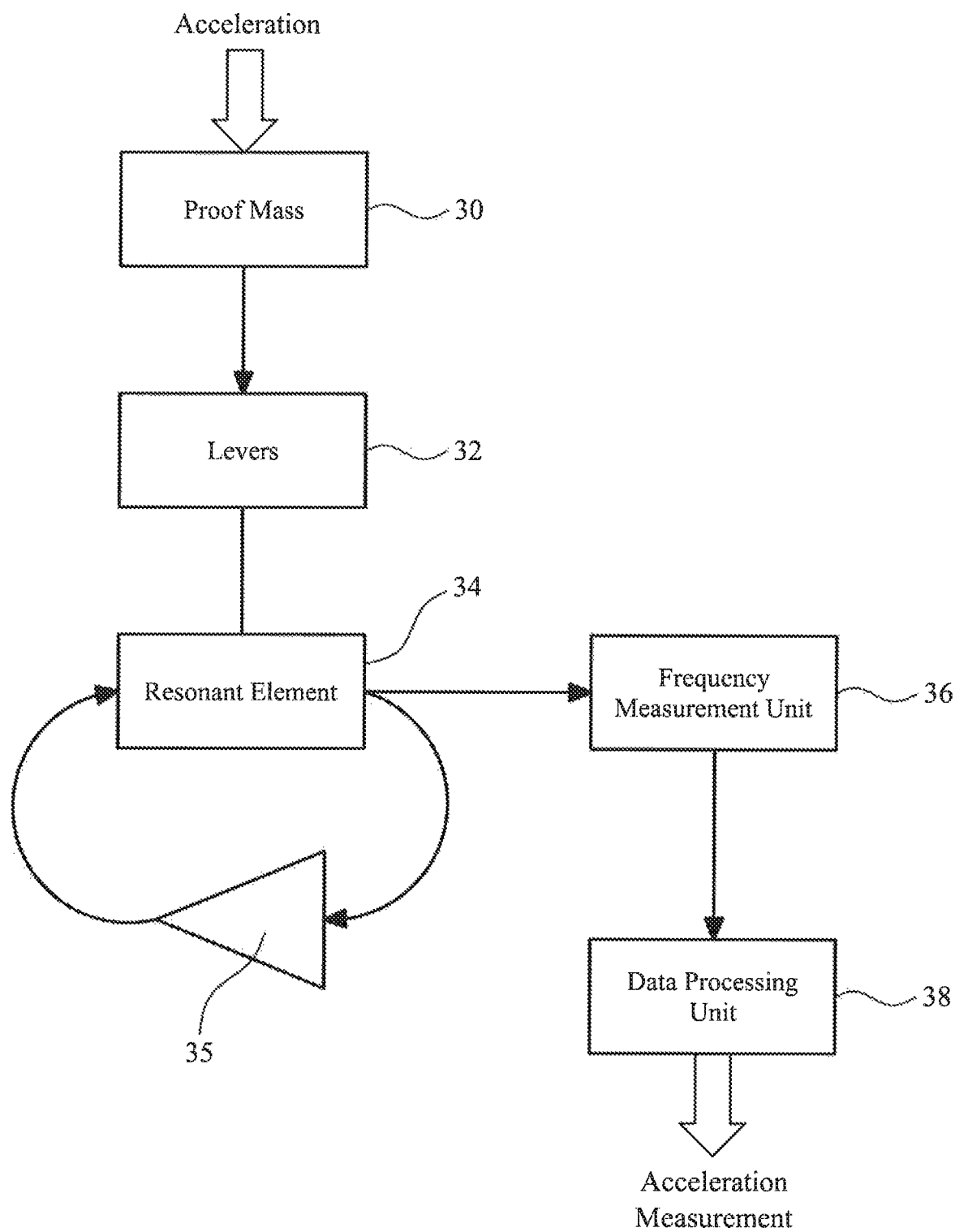
FIG. 2 is a schematic illustration of the principle of operation of a resonant accelerometer.

FIG. 2 is a schematic illustration of the basic elements and principle of operation of the resonant accelerometer shown in FIG. 1. An acceleration acts on the proof masses 30 to generate an inertial force on the sensing axis. The inertial force is amplified by the microlevers 32 to act on the resonant element 34. A feedback loop, including amplifier 35 is used to maintain the resonant element at a resonant frequency. Any change in resonant frequency is measured by frequency measurement unit 36 and processed using a data processing unit 38 to provide an output measured acceleration signal.

Figure 3:
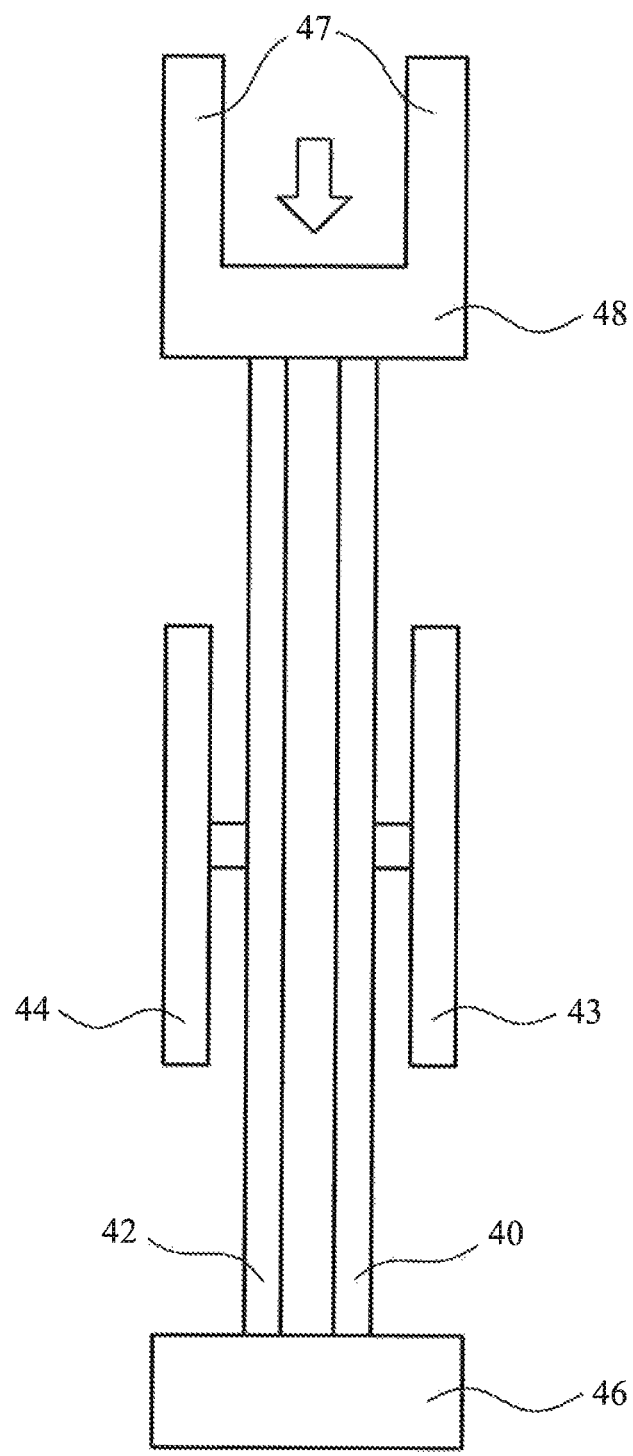
FIG. 3 is a schematic illustration of an example of a resonant element for use in the accelerometer of FIG. 2.

FIG. 3 illustrates one possible design for the resonant element of FIG. 1. The resonant element is double-ended tuning fork (DETF) resonator. The resonant element comprises first and second tines 40, 42 connected between a fixed anchor 46 on the frame and a floating anchor 48 which is connected to the proof mass through the microlevers. Elements 47 are connections to the amplifying microlevers. First and second electrodes 43, 44 are connected to the first and second tines 40,42 and are used to drive and sense the motion of the tines.

The flexures that are used to suspend the proof mass from the frame may be single beam flexures. This offers good cross-axis decoupling of the acceleration. However the stiffness of a single beam flexures is not constant over large displacements but exhibits mechanical nonlinearity (the spring hardening effect). This means that the linear dynamic range may be limited and the inertial force on the resonant elements will be relatively reduced at large displacements. Additionally, stress concentrations are induced at the points of attachment to the substrate providing the potential for increased fragility to shock or external loading. To improve the sensitivity and robustness of the sensor, folded flexural beams can be used. However conventional folded beam designs do not provide good cross-axis decoupling, making them less desirable for a single axis accelerometer. So to improve sensitivity of the accelerometer, it is advantageous to use serpentine flexures to suspend the proof mass from the frame. A serpentine shape can minimise the spring hardening effect but still maintain good cross-axis decoupling.

Figure 4:
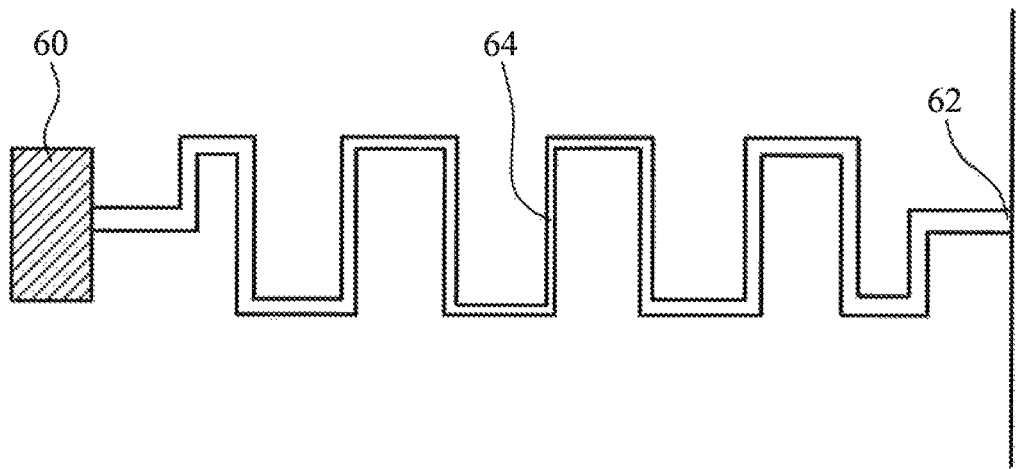
FIG. 4 is a schematic illustration of a serpentine flexure.

FIG. 4 illustrates a serpentine flexure. The flexure has a first end 60, which may be fixed to the proof mass, and a second end 62, which may be connected to the frame. The flexure consists of a number of short beam segments connecting as a snake shape. The width of each beam segment is continuously reducing from the two fixed ends 60, 62 to the central portion 64 to effectively redistribute the stress along the whole suspension under transverse load. This results in more even stress distribution on the flexure compared to the single beam suspension under the same load. Also, if the length of each beam segment is short, the "snake shape" maintains the good cross-axis decoupling effectiveness. In the example shown in FIG. 4, the beam width is 5 µm at the fixed ends 60, 62 and reduces to 2 µm in the central region 64. The length of each beam segment increases towards the central region, with the length of the segments at the fixed ends being 20 µm and increasing to 40 µm in the central region. The interior corners of the serpentine flexure are also filleted to reduce concentration of stress at the corners.

In order to further improve cross-axis decoupling, a link beam may be added between the proof mass and a main beam of each microlever, extending parallel to the sensitive axis. Each link beam may be located close to the input beam connecting the main beam of the respective microlever to the proof mass.

Figure 5A:
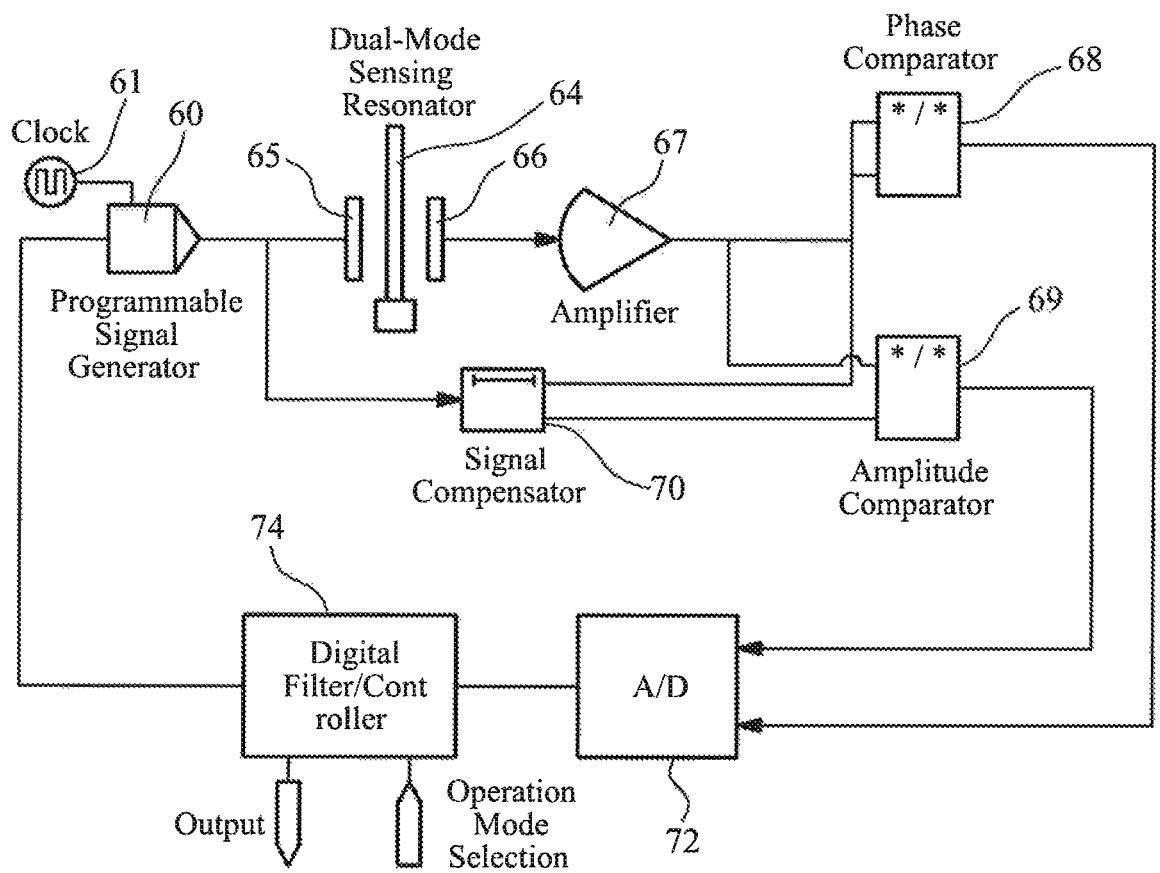
FIG. 5a is an illustration of one drive and sensing circuit for use with the accelerometer of FIG. 1.

In order to drive the resonant element in a particular resonant mode and detect changes in resonant frequency, drive and sense circuitry is required. FIG. 5A illustrates a first example of a drive and measurement circuit, which can be used for the resonant element of FIG. 1.

The circuit comprises a variable frequency signal source 60. The variable frequency signal source in this embodiment comprises a direct digital synthesiser (DDS) chip. The variable frequency signal source in this embodiment comprises a local oscillator as a reference clock signal 61. The variable frequency signal source is connected to a first port of the resonant sensor 64, which is a first electrode 65 adjacent to the resonant element. The response or output from the sensor can be read from a second electrode 66 adjacent the resonant element.

The system comprises an amplifier 67, to which the second electrode 66 is connected. An output of the amplifier is connected to a phase comparator 68.

A signal compensator 70 is connected between the variable frequency signal source 60 and the phase comparator 68. The signal compensator 70 introduces a phase shift that compensates for phase shifts that arise in the signal path through the resonant sensor to the phase comparator. The amount of phase shift can be calibrated in a set up procedure.

The phase comparator 68 compares the phase of the signal from the amplifier 67 with the phase of the signal from the signal compensator 70. The output of the phase comparator is a quasi-DC voltage output proportional to the relative phase difference. This relative phase difference is indicative of a difference between the frequency of the input signal and the resonant frequency of the resonant sensor in the existing conditions. The output of the phase comparator is therefore a measure of a change in resonant frequency of the resonant sensor.

The resonant frequency of the resonant sensor is dependent on the input acceleration, so the output of the phase comparator is a measure of a change in input acceleration.

The circuit comprises an analogue-to-digital convertor (ADC) 72 to convert the output from the phase comparator to a digital signal suitable for the microcontroller 74. The microcontroller 74 receives the signal from the ADC 72. The value of the signal from the ADC is indicative of how close the frequency of the signal from the variable frequency signal source is to the resonant frequency of the resonant sensor. The microcontroller 74 is connected to the variable frequency signal source. In a closed loop mode, signals from the microcontroller are used to change the frequency of the input signals generated by the variable frequency signal source. As described, shifts in the resonant frequency of the resonant sensor provide a measure of a change in acceleration.

The circuit of FIG. 5A also includes an amplitude comparator connected to both the amplifier 67 and the signal compensator 70. The output of the amplitude comparator is input to the ADC 72 and then to the microcontroller 74. The output from the amplitude comparator may be used when the resonant sensor has an amplitude response indicative of the input measurand. For example, the resonant sensor may be a mode—localisation sensor comprising two weakly coupled resonant elements, one of which is exposed to the inertial force resulting from an acceleration, as will be described with reference to FIG. 8, in which the amplitude ratio between the output of the resonant sensor and second input signal is indicative of the input measurand.

The circuit shown in FIG. 6A can operate in closed loop and open loop modes. In closed loop mode, the frequency of the input signals is adjusted based on instructions from the microcontroller in order to synchronise with the resonant frequency of the resonant sensor. In the open loop mode, the microcontroller does not feedback to the variable frequency signal source. Instead, the frequency of the input signal is fixed and a measurement is taken by the microcontroller. Initially, the system operates in the closed loop mode to fix onto a resonant frequency for the mode of choice. The open loop mode can then be use to provide a high sensitivity measurement.

Figure 5B:
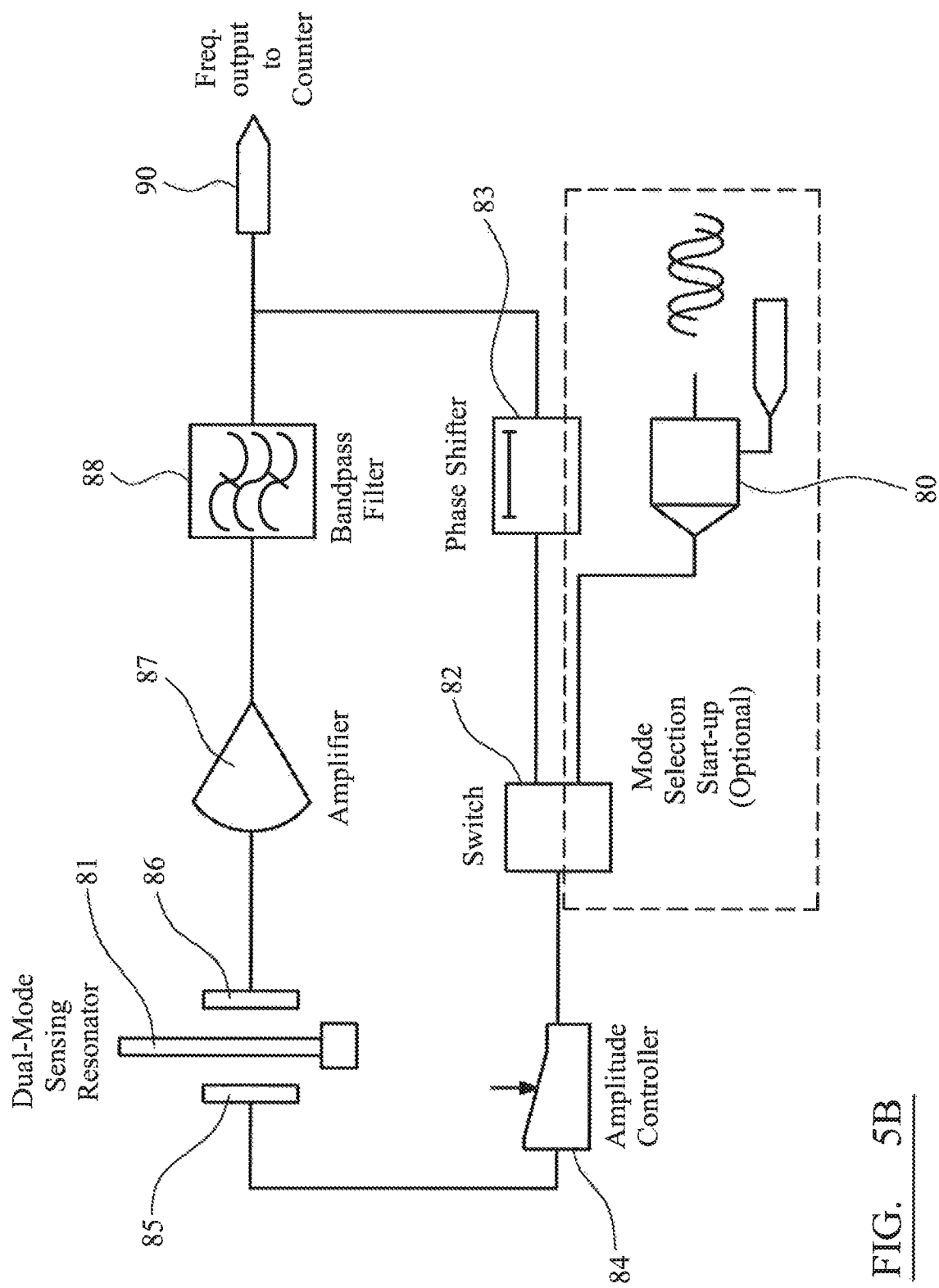
FIG. 5b is an illustration of another drive and sensing circuit for use with the accelerometer of FIG. 1.

FIG. 5B is an alternative drive and sense circuit, which is essentially an oscillator circuit. In the circuit of FIG. 5B a variable frequency signal source 80 is provide an initial signal, the frequency of which selects a mode of vibration for the resonant element. The output of the variable frequency signal source 80 is applied to the drive electrode 85 through an amplitude controller 84 which may be a variable voltage divider. The output of the resonant sensor from electrode 86 is input to an amplifier 87 and then through a bandpass filter 88. The output of the bandpass filter is the circuit output, which may be sent to a frequency counter to determine changes in the resonant frequency of the resonant element. The output of the bandpass filter is fed back to the input electrode 85 through a phase shifter 83 and the amplitude controller 84, to lock onto a resonant frequency of the resonant element. Switch 82 is provided so that the input to the input electrode 85 can be switched from the variable frequency signal source 80 to the feedback signal from the phase shifter 83 once oscillation of the resonant element has been established.

Figure 6:
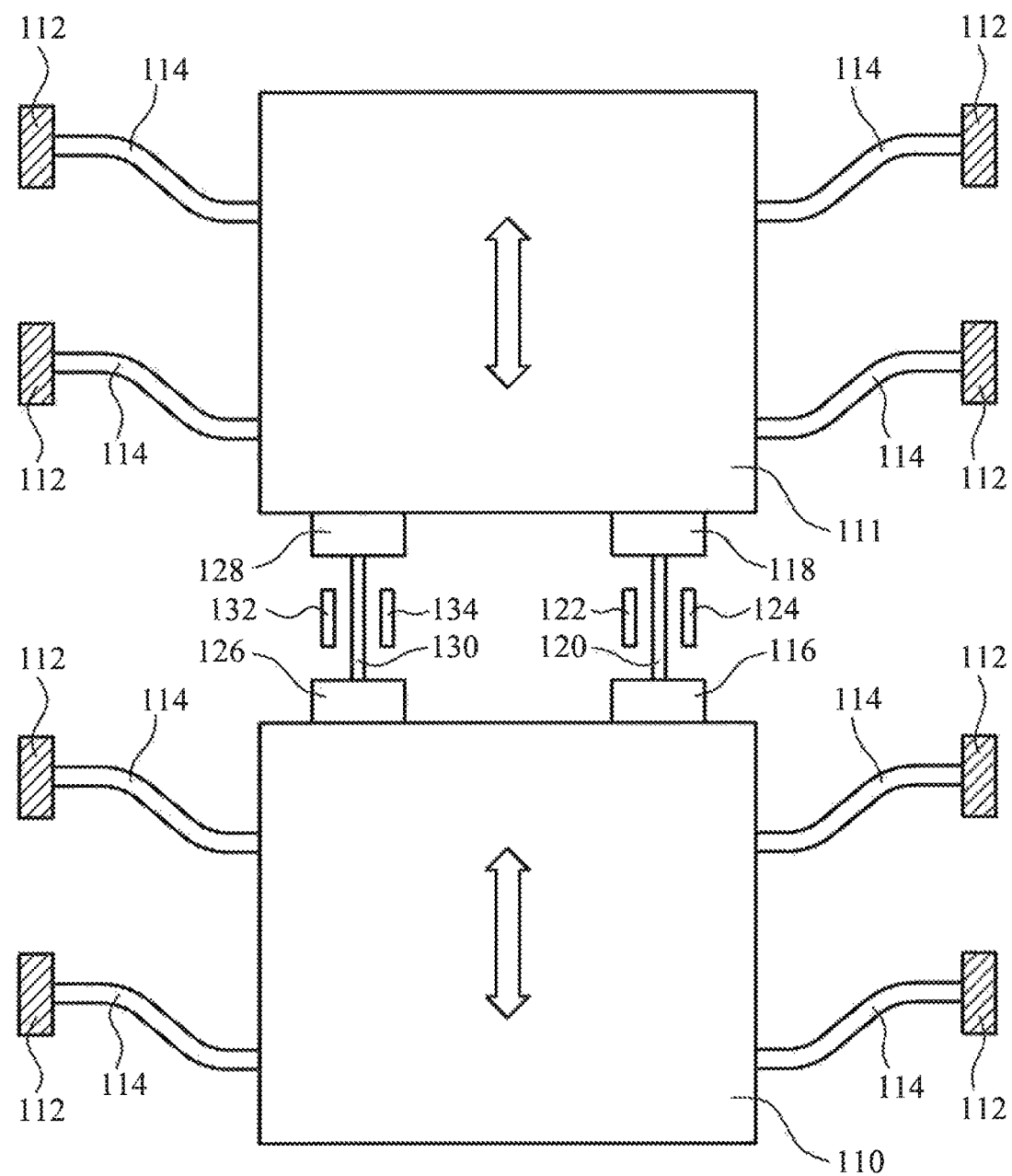
FIG. 6 is a schematic illustration of a modified accelerometer of the type shown in FIG. 2, comprising two resonant elements.

FIG. 6 is a schematic illustration of a modified accelerometer of the type shown in FIG. 2, but comprising two resonant elements. The accelerometer is a MEMS device formed from a single crystal of silicon. The accelerometer comprises a pair of identical proof masses, comprising a first proof mass 110 and a second proof mass 111, suspended from a surrounding frame or substrate 112 by a plurality of flexures 114. A first resonant element 120 is connected at one end to the first proof mass 110 through first amplifying microlever 116. The first resonant element 120 is connected at an opposite side of the second proof mass 111 through a second amplifying microlever 118. The amplifying microlevers 116, 118 are of opposite type to one another. In this example first amplifying microlever 116 is a non-inverting microlever and second amplifying microlever 118 is an inverting microlever. A second resonant element 130, identical to the first resonant element, is connected at one end to the first proof mass 110 through first amplifying microlever 16. The second resonant element 20 is connected at an opposite side of the second proof mass 11 through second amplifying microlever 128. The amplifying microlevers 126, 18 are of opposite type to one another. In this example first amplifying microlever 126 is an inverting microlever and second amplifying microlever 128 is a non-inverting microlever. However, they may be arranged the opposite way around. In order to obtain the maximum common-mode rejection of the influence of temperature, residual stress, and cross-axis vibrations, it is advantageous for the two resonant elements to have identical geometry to one another.

In operation, the resonant elements 120, 130 are driven to resonance by the application of an alternating current to electrodes 124, 134 adjacent to the resonant elements. The accelerometer of FIG. 6 is configured to drive each of the two resonant elements in a different mode, having different resonant frequencies. This allows for a differential output to be used from the first and second resonant elements, eliminating common mode effects, while avoiding coupling effects that would occur if both resonant elements vibrated in the same mode, at closely matched but not identical frequencies.

Figure 7:
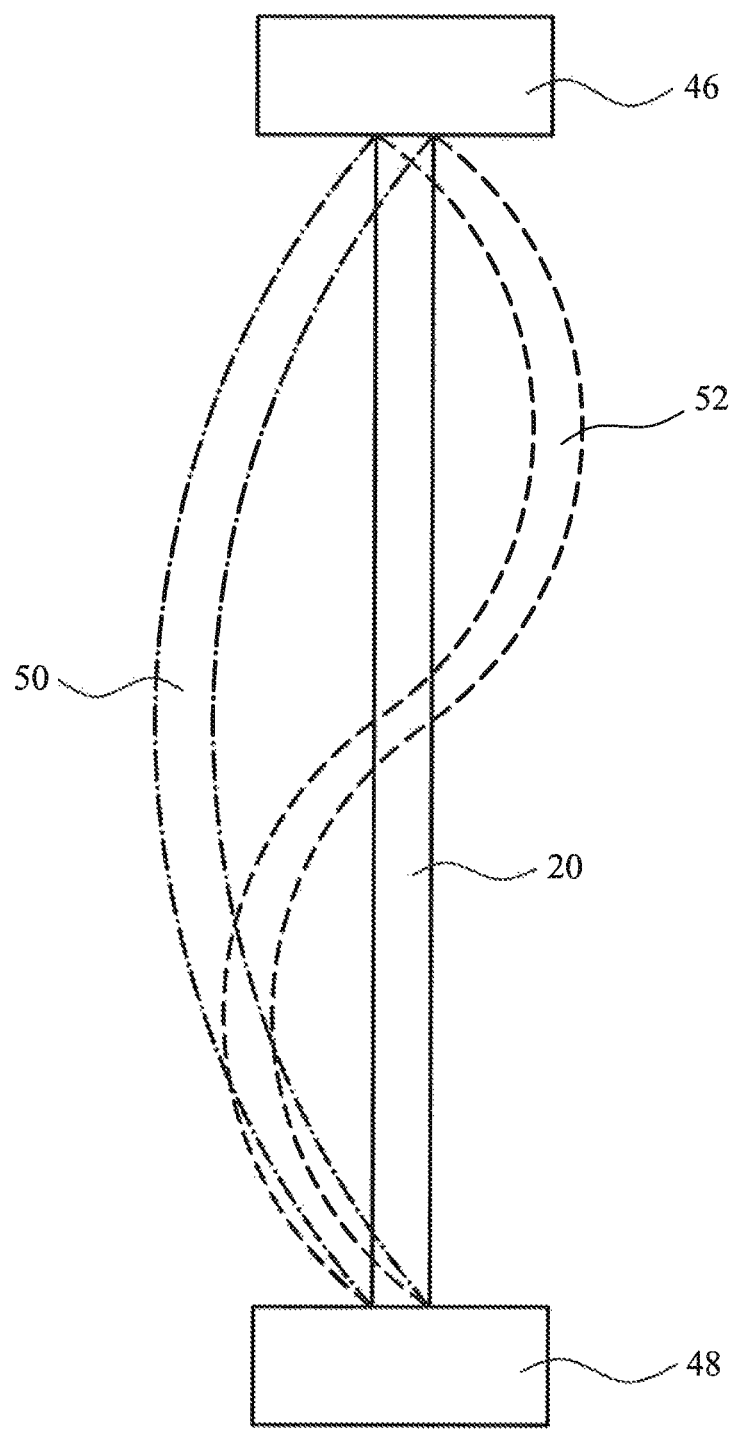
FIG. 7 is a schematic illustration of a modified accelerometer of the type shown in FIG. 2, exploiting mode localisation.

In a preferred embodiment, one of the first and second resonant elements is driven to vibrate in a fundamental mode and the other of the first and second resonant elements is driven to vibrate in a second order mode. FIG. 7 schematically illustrates a resonant element 120 connected between anchors 146 and 148 and the (exaggerated) shape of a fundamental mode of vibration 150 and second order mode of vibration 152. The two modes have different resonant frequencies but both can be independently excited by a single pair of adjacent drive electrodes. It should be understood that modes other than the modes illustrated in FIG. 7 can be used and different topologies for the resonant elements may also be used. However, there is advantage to an arrangement which allows different modes to be driven using a single set of drive electrodes. This preserves the symmetry of the mechanical structure and removes any restriction on which resonant element should operate in which mode.

In this example, one resonant element will undergo compressive strain while the other undergoes tensile strain. This leads to resultant frequency shifts in opposite directions. The difference in frequency shifts can be used as the output of the resonant sensor.

Different modes will give rise to different scale factors. In other words, for a given input acceleration the frequency shift of the resonant frequency of one mode will be different to the frequency shift of the resonant frequency of the other mode. The overall scale factor for the accelerometer will be the average of the two. The use of higher order modes can be advantageous because they will typically give rise to a higher scale factor than lower order modes. The different scale factors mean that the sensor can also be arranged to that both resonant elements experience the same type of strain, i.e. compressive strain or tensile strain and a difference in resonant frequency shift between the two used as an output.

Two circuits of the type shown in FIG. 5A of FIG. 5B may be provided, one for each of the resonant elements in FIG. 6, so that a first resonant element can be driven in a first mode and a second resonant element can be driven in a second mode. A difference between the output frequency shifts from each circuit, may be used to provide a measure of the acceleration experienced by the accelerometer and to cancel common mode effects.

Figure 8:
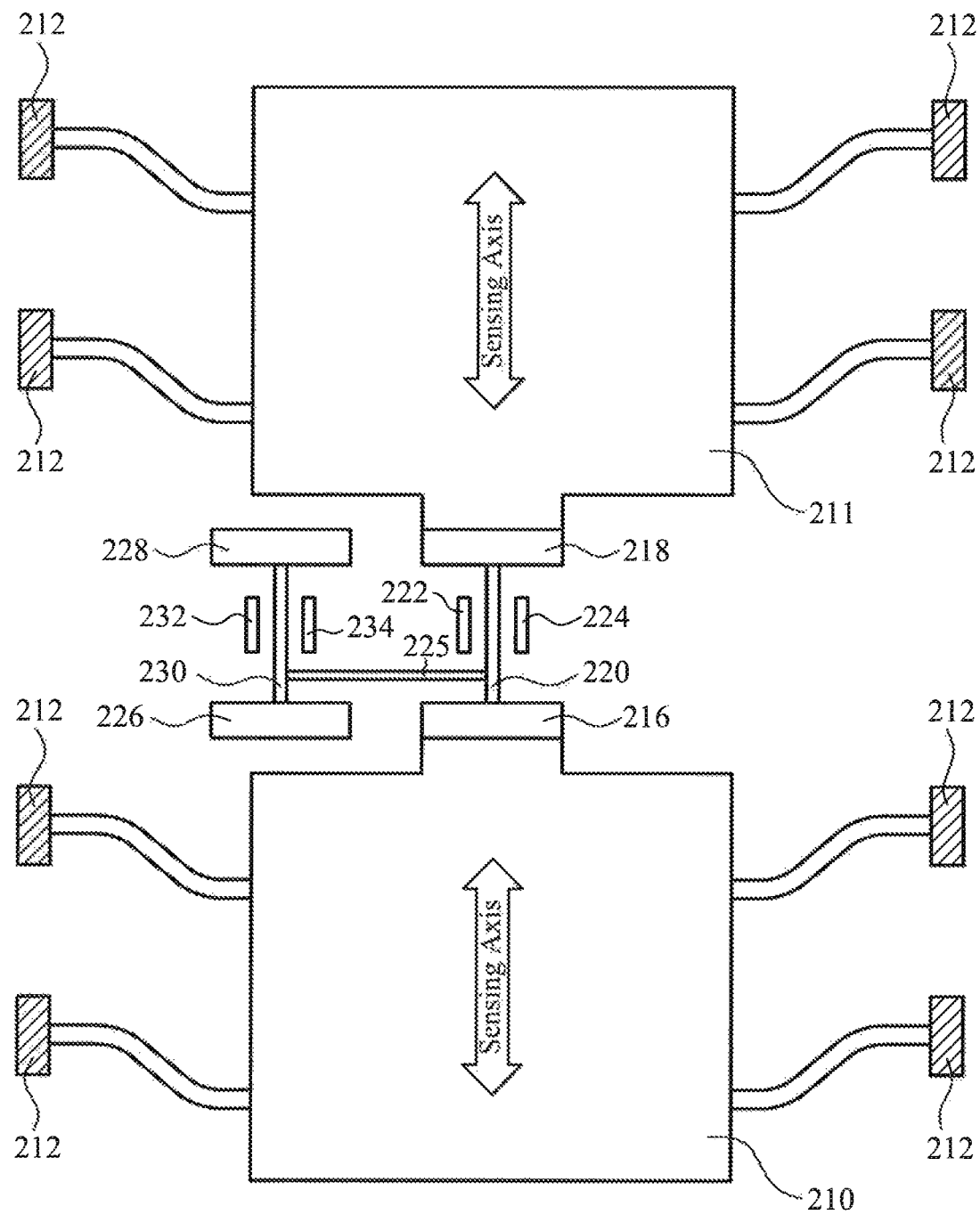
FIG. 8 is a schematic illustration of a modified accelerometer of the type shown in FIG. 2, comprising electrodes on the proof masses and substrate; and, FIG. 9 is a schematic illustration of the use of electrodes on the substrate and the proof mass in a resonant sensor.

FIG. 8 illustrates a further embodiment of the invention that exploits mode localisation in two weakly coupled resonant elements. The embodiment of FIG. 8 is also a MEMS device formed form a single crystal of silicon using well known MEMS fabrication techniques.

The accelerometer of FIG. 8 comprises proof mass 210, 211 suspended from a frame or substrate 212 by a plurality of flexures. The flexures may have a serpentine shape as described with reference to FIG. 4.

The sensor comprises two resonant elements 220, 230, which in this example are again double ended tuning forks (DETFs). A first resonant element 220 is connected at one end to the proof mass 210 through amplifying microlever 216 and at the other end to proof mass 211 though amplifying microlever 218. A second resonant element 230, identical to the first resonant element, is coupled to the first resonant element 220 by a mechanical coupling 225. The second resonant element is connected at one end to an amplifying microlever 226, identical to the amplifying microlever 216, and at the other end to an amplifying microlever 228, identical to the amplifying microlever 218. This provides structural symmetry between the first and second resonant elements. The second resonant element is not connected to the proof mass.

Drive electrodes 224, 234 are provided adjacent the resonant elements in the same manner as for the embodiment of FIG. 1. In operation, the resonant elements 220, 230 are driven to resonance by the application of an alternating current to the drive electrodes The mechanical coupling 225 between the resonant elements in each pair is only a weak coupling. When two vibrating resonant elements are weakly coupled in this way, any change in stiffness of one resonant element relative to the other leads to significant changes in the relative amplitude of vibration of the two coupled resonators. This phenomenon is called mode localisation and explained in detail in WO2011/148137.

The sensing circuit connected to sense electrodes 222, 232 may be configured to provide a output based on a change in relative amplitude or phase of vibration between the first resonant element 220 and the second resonant element 230. The amplitude of one of the resonant elements may be controlled to remain constant using a feedback control scheme and changes in the amplitude of the other resonant element used as an output. A circuit as shown in FIG. 5A, having an amplitude comparator, may be used to provide the output.

Figure 9:
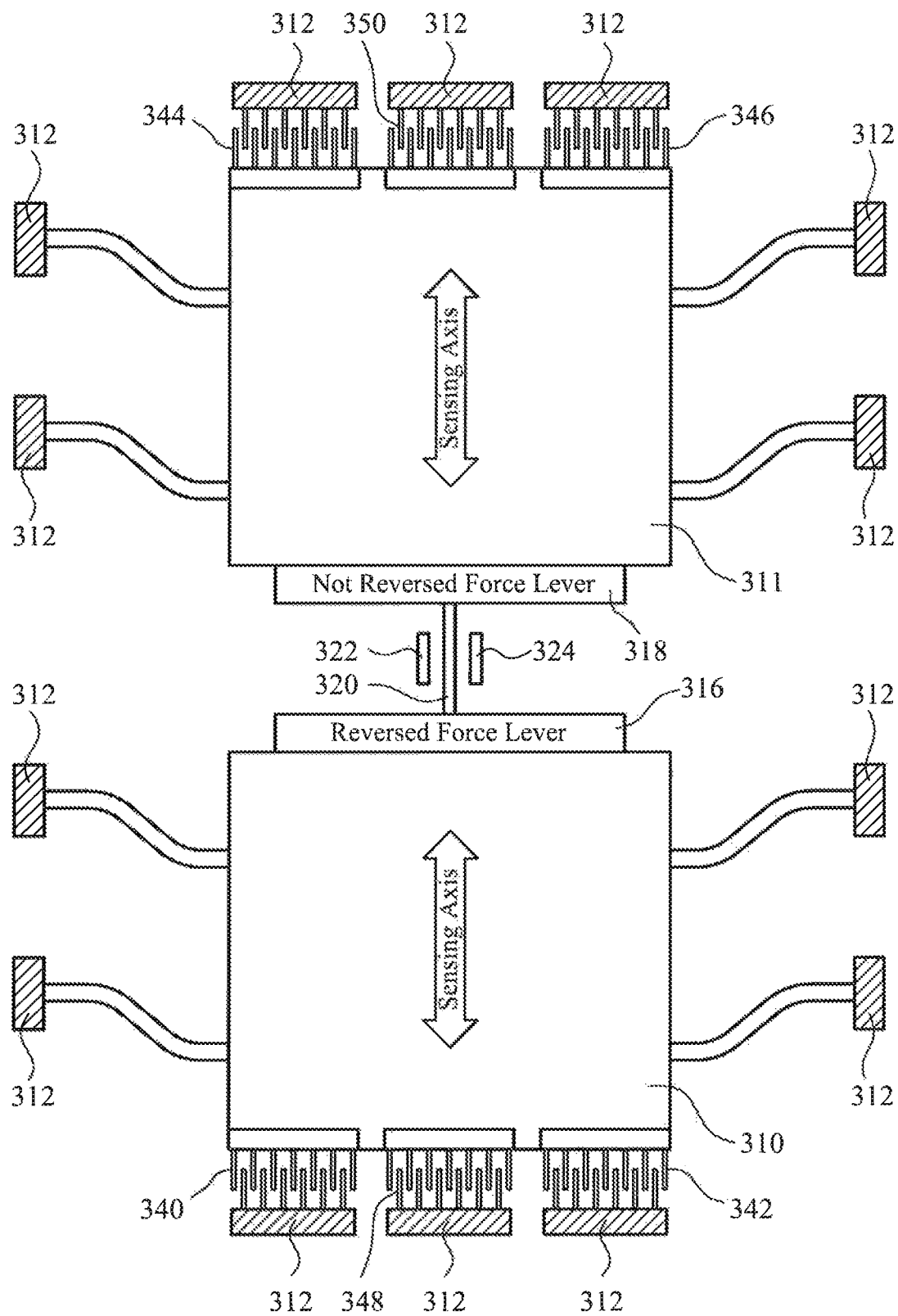

FIG. 9 is a schematic drawing illustrating the use of electrodes on the substrate and the proof mass in a resonant sensor in accordance with the invention. The basic arrangement of the sensor of FIG. 9 is the same as the sensor shown in FIG. 1. The accelerometer is a MEMS device formed from a single crystal of silicon. The accelerometer comprises proof masses 310 and 311 suspended from a surrounding frame or substrate 312 by a plurality of flexures. A first resonant element 320 is connected between the two proof masses 310, 311 through amplifying microlevers of opposite type to one another. In operation, the resonant element 320 is driven to resonance by the application of an alternating current to electrode 324 adjacent to the resonant element.

In addition six sets of comb electrodes 340, 342, 344, 346, 348, 350 are provided, with one half of each set of electrodes fixed to the substrate 312 and the other half fixed to one of the proof masses 310, 311. The comb electrodes (although other arrangements of electrode may be used) can be operated to provide various different functions.

A first function of the comb electrodes is to allow for automatic calibration of the sensor. One or more of the calibration electrodes may be used to force the proof masses to vibrate at a known frequency and amplitude. This is achieved by applying a predetermined calibration signal to the substrate side of the electrode set. In one example, four electrodes 340, 342, 344, 346 are used to apply a calibration signal. This will force the proof masses to vibrate along the sensitive axis of the sensor with a known amplitude and frequency. The resonant element can be driven at a resonant frequency, as described with reference to FIG. 1. The maximum change in the resonant frequency of the resonant element can then be measured and recorded to derive the scale factor of the sensor. The process may be repeated for different modes of vibration of the resonant element, to derive the scale factor for each mode of vibration.

This calibration process can be carried out automatically even after the sensor has been deployed. For example, a gravity sensor in accordance with the invention may be deployed down an oil or gas bore hole, and so may be inaccessible to technicians. The provision of the comb electrodes allows for automated and remote calibration to be performed.

One or more of the comb electrodes illustrated in FIG. 9 can also be used to apply a static bias to the proof masses along the sensitive axis, thereby applying a static strain on the resonant element. This can reduce the temperature sensitivity of the sensor and increase the acceleration sensitivity, at the expense of dynamic range.

The comb electrodes 340, 342, 344, 346, 348, 350 can also be used to provide active damping of the proof mass. For example, comb electrodes 340, 342, 344, 346 can be used to sense oscillation to the proof mass, and comb electrodes 348, 350 may then apply a damping signal, out of phase with the sensed oscillation of the proof mass, to damp the proof mass. The damping signal may have a decaying amplitude, corresponding to the reducing amplitude of vibration of the proof mass. This damping process may be carried out automatically when an sensed amplitude of vibration of the proof mass exceeds a threshold limit. Damping the proof mass in this way allows for accurate measurements to be taken quickly even after the sensor has experienced a shock.

The embodiments described each comprise two identical proof masses. It should be clear that a single proof mass with a central aperture may also be used, with the resonant element or elements connected on opposite sides of the aperture.

It should be clear that features and aspects described in relation to each embodiment of the invention may be applied to other embodiments of the invention.

The invention claimed is:

1. A resonant sensor comprising:
   a substrate;
   one or more proof masses suspended from the substrate to allow for movement of the one or more proof masses along a sensitive axis;
   a first resonant element having a first end and a second end, the first resonant element extending between the first end and the second end along the sensitive axis, wherein the first end is connected to the one or more proof masses through a non-inverting lever and the second end is connected to the one or more proof masses through an inverting lever;
   an electrode assembly positioned adjacent to the first resonant element,
   wherein the inverting lever is a lever that provides an output force or displacement in an opposite direction to an input force or displacement, and
   wherein the non-inverting lever is a lever that provides an output force or displacement in the same direction to an input force or displacement.

2. The resonant sensor according to claim 1, wherein the first resonant element is not directly connected to the substrate.

3. The resonant sensor according to claim 1, comprising a first proof mass and a second proof mass, the first end of the first resonant element connected to the first proof mass though the non-inverting lever and the second end of the first resonant element connected to the second proof mass through the inverting lever.

4. The resonant sensor according to claim 1, wherein the electrode assembly comprises a pair of plate electrodes positioned on opposite sides of the first resonant element.

5. The resonant sensor according to claim 1, wherein the first resonant element is a single rectangular beam or a double ended tuning fork (DETF) resonator.

6. The resonant sensor according to claim 1, wherein each of the levers comprises a main beam extending orthogonal to the sensitive axis.

7. The resonant sensor according to claim 6, further comprising a stiffening beam extending between the main beam of each lever and the one or more proof masses, the stiffening beam extending along the sensitive axis.

8. The resonant sensor according to claim 1, further comprising a drive and sense circuitry connected to the electrode assembly, the drive and sense circuitry configured to drive the first resonant element in a first resonant mode and to sense a response of the first resonant element.

9. The resonant sensor according to claim 8, wherein the sense circuitry is configured to provide an output based on a resonant frequency shift of the first resonant element.

10. The resonant sensor according to claim 8, further comprising a second resonant element coupled to the first resonant element and wherein the sense circuitry is configured to provide an output based on a change in relative amplitude or phase of vibration between the first resonant element and the second resonant element.

11. The resonant sensor according to claim 8, further comprising a second resonant element having a first end and a second end, the second resonant element extending between the first end of the second resonant element and the second end of the second resonant element along the sensitive axis, wherein the first end of the second resonant element is connected to the one or more proof masses through a non-inverting lever and the second end of the second resonant element is connected to the one or more proof masses through an inverting lever, and wherein the drive and sense circuitry is configured to drive the second resonant element in a different resonant mode to the first resonant mode and to sense a response of the second resonant element, and wherein the sense circuitry is configured to provide an output based on a resonant frequency shift of the first resonant element and a resonant frequency shift of the second resonant element.

12. The resonant sensor according to claim 1, wherein the one or more proof masses are suspended from the substrate by a plurality of flexures and wherein one or more of the flexures has a serpentine shape.

13. The resonant sensor according to claim 12, wherein the one or more serpentine flexures has a variable thickness such that the thickness of the one or more serpentine flexures is lower in a mid-section between the substrate and the one or more proof masses than at end-sections that are respectively connected to the substrate and the one or more proof masses.

14. The resonant sensor according to claim 1, wherein the resonant sensor is microelectromechanical systems (MEMS) sensor.

15. The resonant sensor according to claim 12, wherein the substrate, one or more proof masses, plurality of flexures and first resonant element are formed from silicon.

16. The resonant sensor according to claim 1, wherein the resonant sensor is configured as a gravity sensor.

17. The resonant sensor according to claim 1, further comprising a substrate electrode on the substrate, adjacent to the one or more proof masses; and
an electric circuitry connected to the substrate electrode configured to apply a voltage to the substrate electrode providing an electrostatic force on the one or more proof masses.

18. The resonant sensor according to claim 17, wherein the electric circuitry is configured to apply an alternating calibration signal to the substrate electrode to drive the one or more proof masses at a calibration frequency, and wherein the resonant sensor is configured to use a response of the first resonant element at the calibration frequency to calibrate the resonant sensor.

19. The resonant sensor according to claim 17, wherein the electric circuitry is configured to apply a DC biasing voltage to the substrate electrode.

20. The resonant sensor according to claim 17, further comprising at least one additional electrode on the substrate, adjacent to the one or more proof masses, wherein the electric circuitry is configured to apply a damping signal to the substrate electrode or the at least one additional electrode.

* * * * *